United States Patent [19]
Bizot et al.

[11] Patent Number: 5,750,037
[45] Date of Patent: May 12, 1998

[54] USE OF TARTRONIC ACID AS AN OXYGEN SCAVENGER

[75] Inventors: Paul M. Bizot, Lisle; Bruce R. Bailey, Batavia; Peter D. Hicks, Oak Park, all of Ill.

[73] Assignee: Nalco Chemical Company, Naperville, Ill.

[21] Appl. No.: 732,545

[22] Filed: Oct. 15, 1996

[51] Int. Cl.$^6$ ............................................. C02F 1/70
[52] U.S. Cl. .................. 210/750; 210/757; 252/188.28; 252/392; 252/396; 422/16; 422/17
[58] Field of Search ....................... 210/749, 750, 210/757; 252/188.28, 390, 396, 392; 422/16, 17

[56] References Cited

U.S. PATENT DOCUMENTS

| | | | |
|---|---|---|---|
| 4,012,195 | 3/1977 | Noack | 252/389 R |
| 4,022,711 | 5/1977 | Noack | 252/188 |
| 4,026,664 | 5/1977 | Noack | 252/390 |
| 4,096,090 | 6/1978 | Noack | 252/390 |
| 4,269,717 | 5/1981 | Slovinsky | 210/750 |
| 4,363,734 | 12/1982 | Slovinsky | 210/750 |
| 4,512,552 | 4/1985 | Katayama et al. | 252/392 |
| 4,968,438 | 11/1990 | Soderquist et al. | 210/750 |
| 5,258,125 | 11/1993 | Kelley et al. | 210/750 |
| 5,384,050 | 1/1995 | Kelley et al. | 210/750 |
| 5,531,934 | 7/1996 | Freeman et al. | 252/390 |
| 5,658,464 | 8/1997 | Hann et al. | 210/697 |

OTHER PUBLICATIONS

Kirk–Othmer Encyclopedia of Chemical Technology, Third Edition, Interscience Publishers, vol. 12, pp. 734–771.

*Primary Examiner*—Peter A. Hruskoci
*Attorney, Agent, or Firm*—Thomas M. Breininger; Kelly L. Cummings

[57] ABSTRACT

The invention is a method for removing dissolved oxygen from alkaline water which comprises adding to alkaline water containing dissolved oxygen an effective oxygen-scavenging amount of a water-soluble carboxylate at temperatures above 400° F. A preferred material is tartronic acid. At lower temperatures, a catalyst is also required.

10 Claims, 2 Drawing Sheets

USE OF TARTRONIC ACID AS AN OXYGEN SCAVENGER

FIELD OF THE INVENTION

The invention is a method for removing dissolved oxygen from alkaline water which comprises adding to alkaline water containing dissolved oxygen an effective oxygen-scavenging amount of a water-soluble carboxylate at temperatures above 400° F. A preferred material is tartronic acid. At lower temperatures, a catalyst is also required.

BACKGROUND OF THE INVENTION

Efficient operation of boilers and other steam-run equipment requires chemical treatment of feedwater to control corrosion. Corrosion in such systems generally arises as a result of oxygen attack of steel in water supply equipment, pre-boiler systems, boilers, and condensate return lines. Oxygen attack of steel is exacerbated by the unavoidable high temperatures found in boiler equipment. Since acidic conditions also accelerate corrosion, most boiler systems are run in an alkaline environment.

The action of dissolved gases such as oxygen and carbon dioxide are two of the main factors that lead to feedwater system and boiler corrosion. In order to understand the role of dissolved gases in corrosion, one must understand the electrochemical nature of corrosion.

Corrosion processes involve reactions where one species is oxidized $$M \rightarrow M^{2+} + 2e^-$$

and another is reduced.

$$x + e^- \rightarrow x^-$$

In boiler systems the two species involved in the redox chemistry are typically two different metals, a metal and oxygen, or a metal and water. Under most conditions, oxidation of iron occurs.

$$Fe^0 \rightarrow Fe^{2+} + 2e^-$$

A current of electrons then flows from this anodic region to a point where reduction takes place. If oxygen is present, the cathodic reaction is $$O_2 + H_2O + 4e^- \rightarrow 4OH^-$$

In the absence of oxygen, water is reduced to hydrogen.

$$2H_2O + 2e^- \rightarrow H_2 + 2OH^-$$

Any agent that inhibits either the anodic or cathodic reaction will stop corrosion from occurring. Metal passivation, the formation of a protective oxide film, is one common example of a process that inhibits corrosion by blocking one of the electrochemical reaction pathways.

The severity of oxygen corrosion will depend on the concentration of dissolved oxygen in the water, water pH and temperature. As water temperature increases, corrosion in feed lines, heaters, boiler, steam and return lines made of iron and steel increases.

In most modern boiler systems, dissolved oxygen is handled by first mechanically removing most of the dissolved oxygen and then chemically scavenging the remainder. Mechanical degasification is typically carried out with deaerating heaters, which will reduce oxygen concentrations to the range of 0.005–0.050 mg/L.

Chemical scavenging of the remaining dissolved oxygen is widely accomplished by treating the water with an oxygen scavenger, such as hydrazine or sodium sulfite. See, for example, the Kirk-Othmer Encyclopedia of Chemical Technology, Third Edition, Interscience Publishers, Volume 12, pages 734–771 in reference to hydrazine. As explained in Kirk-Othmer, hydrazine efficiently eliminates the residual oxygen by reacting with the oxygen to give water and gaseous nitrogen. In addition, hydrazine is a good metal passivator since it forms and maintains an adherent protective layer of magnetite over iron surfaces.

It is, however, widely recognized that hydrazine is a toxic chemical. Kirk-Othmer reports that it is highly toxic and readily absorbed through the mouth, skin and respiratory system, and that permanent corneal damage may result from contact with the eye. Low doses may cause central nervous system depression and high doses may cause convulsions and other damaging side effects.

Among other approaches to the scavenging of oxygen in boiler systems include: carbohydrazones as disclosed in U.S. Pat. No. 5,258,125; gallic acid as disclosed in U.S. Pat. No. 4,968,438; carbohydrazide as disclosed in U.S. Pat. No. 4,269,717 and 1,3 dihydroxy acetone as disclosed in U.S. Pat. No. 4,363,734. However, there is still a need for more efficient and less toxic treatment chemicals. Therefore, it is an object of this invention to provide oxygen scavenging treatments which scavenge oxygen and reduce corrosion rates of steel surfaces under typical boiler use conditions.

SUMMARY OF THE INVENTION

The invention is a method for removing dissolved oxygen from alkaline water which comprises adding to alkaline water containing dissolved oxygen an effective oxygen-scavenging amount of a water-soluble carboxylate at temperatures above 400° F. A preferred material is tartronic acid. At lower temperatures, a catalyst is also required.

DESCRIPTION OF THE INVENTION

Figure 1:
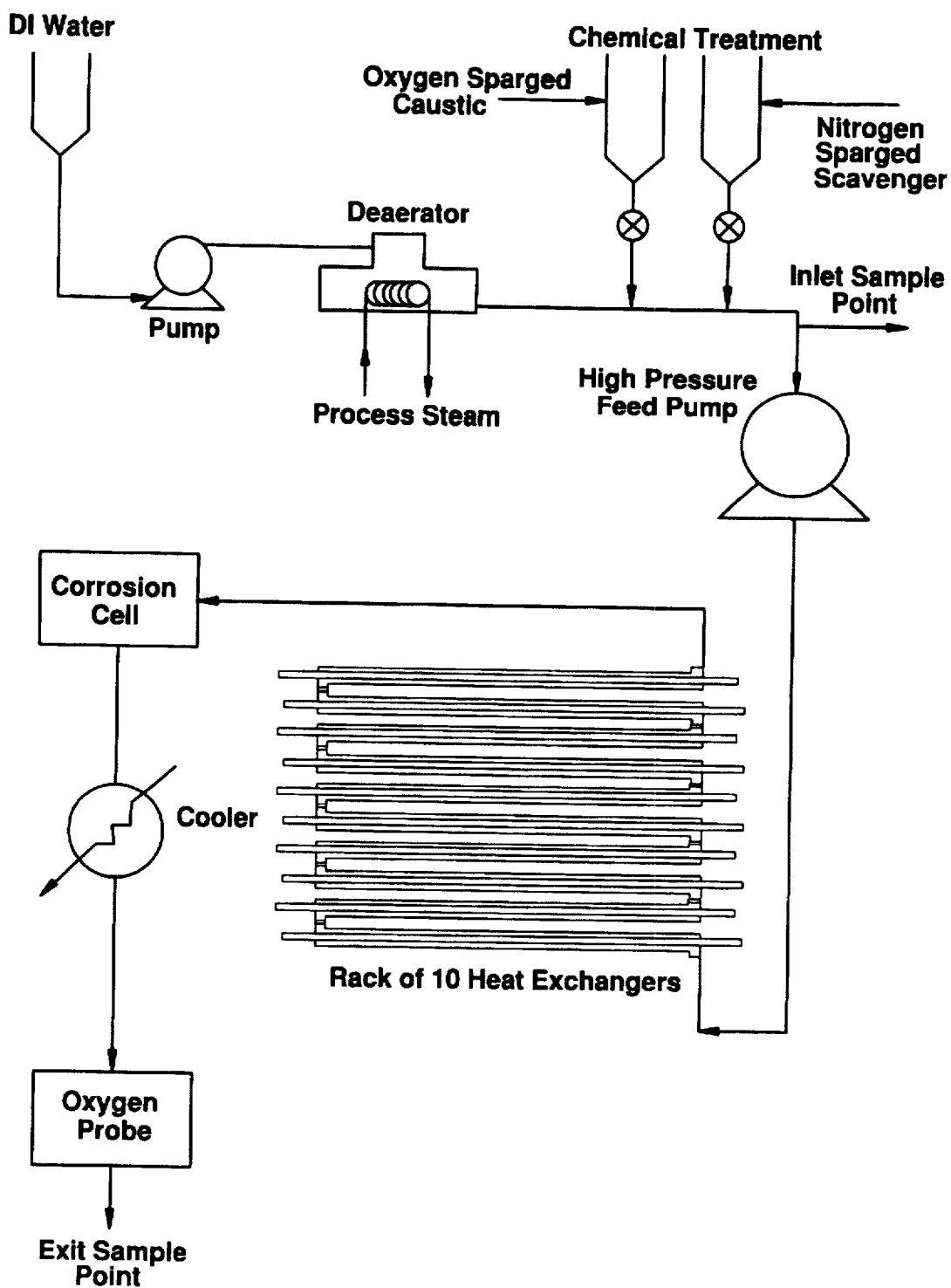
FIG. 1 is a schematic of a pre-boiler system.

The invention is directed generally to reducing corrosion in boiler systems and more particularly to treating boiler water to remove dissolved oxygen.

The invention is a method for removing dissolved oxygen from alkaline water at a temperature greater than 400° F. which comprises adding to alkaline water containing dissolved oxygen an effective oxygen-scavenging amount of a water-soluble carboxylate of the formula:

$$R_1-\overset{O}{\underset{\|}{C}}-\overset{OH}{\underset{|}{CH}}-\overset{O}{\underset{\|}{C}}-O^{\ominus}M^{\oplus}$$

wherein M is selected from the group consisting of hydrogen, sodium, zinc, potassium, morpholine, cyclohexylamine, methoxypropylamine, diethylaminoethanol and diethyl hydroxylamine; and $R_1$ is selected from the group consisting of hydrogen, hydroxy, $C_1$–$C_6$ alkyl, aryl, and —$CH_2$—OH.

From 2 to 10 moles of carboxylate per mole of dissolved oxygen may be added to said water. The alkaline water may be boiler water. The boiler water may be subjected to deaeration to reduce the level of dissolved oxygen and the carboxylate may be added to the boiler water after deaeration to remove remaining dissolved oxygen. M may be hydrogen and $R_1$ may be hydroxy.

The invention is also a method for removing dissolved oxygen from alkaline water at a temperature between 250° and 400° F. which comprises adding to alkaline water containing dissolved oxygen a) an effective oxygen-scavenging amount of a water-soluble carboxylate of the formula:

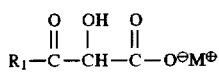

wherein M is selected from the group consisting of hydrogen, sodium, zinc, potassium, morpholine, cyclohexylamine, methoxypropylamine, diethylaminoethanol and diethyl hydroxylamine; and $R_1$ is selected from the group consisting of hydrogen, hydroxy, $C_1$–$C_6$ alkyl, aryl, and —$CH_2$—OH; and b) an effective catalyzing-amount of a catalyst capable of undergoing oxidation-reduction reactions selected from the group consisting of copper, cobalt, manganese, nickel, iron, hydroquinone and combinations thereof.

From 2 to 10 moles of carboxylate per mole of dissolved oxygen may be added to said water. The alkaline water may be boiler water. The boiler water may be subjected to deaeration to reduce the level of dissolved oxygen and the carboxylate may be added to the boiler water after deaeration to remove remaining dissolved oxygen. M may be hydrogen and $R_1$ may be hydroxy.

Although the carboxylate compounds may be added to the boiler system at any point, it is most efficient to treat the boiler feedwater, preferably as it comes from the dearator. Residence times prior to steam formation should be maximized to obtain maximum corrosion protection. Carboxylate compounds will reduce oxygen and corrosion rates even at residence times of less than 3 minutes.

The amount of carboxylate compound required to effectively scavenge oxygen from the boiler water is dependent upon the amount of oxygen actually present therein. It is generally desirable that at least 2 moles of carboxylate be used per mole of oxygen. These minimum levels of carboxylate compounds will have the added benefit of reducing general corrosion.

Carboxylate compounds are effective oxygen scavengers and also reduce general corrosion rates over the entire range of temperatures to which boiler water is generally subjected. Typically, these temperatures will lie in the range of 190°–550° F.

While carboxylate compounds may be used alone effectively in the present application, they may also have enhanced activity when catalyzed. For this purpose, it is desirable to employ catalysts which undergo redox reactions. Useful catalysts in the present application include cobalt, preferably in a stabilized form. The amount of cobalt used should be in the range of 0.2 to about 20% by weight of the carboxylate compound. Typical useful stabilized cobalt complexes are described in the following U.S. patents which are incorporated by reference: 4,012,195; 4,022,711; 4,026,664 and 4,096,090.

Copper (II) salts are also useful catalysts. As used herein, the term alkaline water refers to water with a pH of at least 8.

EXAMPLE 1

The apparatus of FIG. 1 was utilized to evaluate the efficiency of various oxygen scavengers. Reference is made to FIG. 1. The feedstream was ambient temperature (22° C.) deionized water. The feedwater was mechanically deaerated to provide a dissolved oxygen value of 1 ppb. The pH of the feedwater was adjusted to within the range of 9.0–9.5 with reagent grade sodium hydroxide, sparged with high purity oxygen to provide an oxygen baseline feed of 40 ppb. All wetted parts were constructed from 316 stainless steel. Metering plunger pumps were used for injection of scavenger. A high pressure feed pump pressurized the flow to 1100 psig. A series of tube-in-shell heat exchangers used electrical heaters to raise the water temperature to 400° F., with a water residence time of 2–3 minutes. After flowing through electrochemical monitoring cells, the water stream was cooled to ambient temperature within a few seconds, the pressure was released, and the oxygen concentration of the effluent water was continuously monitored utilizing an Orbisphere oxygen probe at the exit sample point.

Treatment A (control) was obtained from EM Industries in Gibbstown, N.J.; treatments B, C, D and H are available from Nalco Chemical Company in Naperville, Ill.: treatments E, F and J were obtained from Aldrich Chemical Co., Milwaukee, Wis.; G was obtained from JT Baker Inc. in Philipsburg, N.J.; I was obtained from Lancaster Synthesis in Windham, N.J.; and tartronic acid was obtained from Fluka Chemical Co. in Ronkonkoma, N.Y.

This procedure was utilized to obtain the results of Table I. As evident from the Table, tartronic acid is much more efficient at removing dissolved oxygen than the conventional treatments, which include erythorbic acid and hydroquinone; without increasing the corrosivity of the system.

TABLE I

Results at 400° F.

| Designation | Treatment | Solution Concentration (ppm) | % DO Reduced |
|---|---|---|---|
| A | sodium hydroxide and Deionized Water | | 0 |
| B | carbohydrazide | 0.11 | 48 |
| C | erythorbic acid | 0.83 | 76 |
| D | methyl tetrazone | 0.14 | 29 |
| E | hydrazine | 0.08 | 20 |
| F | hydroquinone | 0.52 | 17 |
| G | sodium sulfite | 0.60 | 76 |
| H | diethyl hydroxylamine | 0.42 | 26 |
| I | methyl ethyl ketoxime | 0.41 | −11 |
| J | n-isopropyl hydroxylamine | 0.23 | 15 |
| K | tartronic acid | 0.63 | 97.6 |

The experimental procedure of Example I was utilized to obtain the data of Table II. The calculations show the greatly improved efficiency of tartronic acid over erythorbic acid when dosed in equivalent amounts.

TABLE II

Efficiency Comparison at 400° F.

| | % $O_2$ Removed (40 ppb initial concentration) | |
|---|---|---|
| Equivalents of scavenger/mole $O_2$ | Tartronic Acid | Erythorbic Acid |
| 1:1 | 96.6 | 67 |
| 2.75:1 | 98.5 | 83 |

EXAMPLE 3

Figure 2:
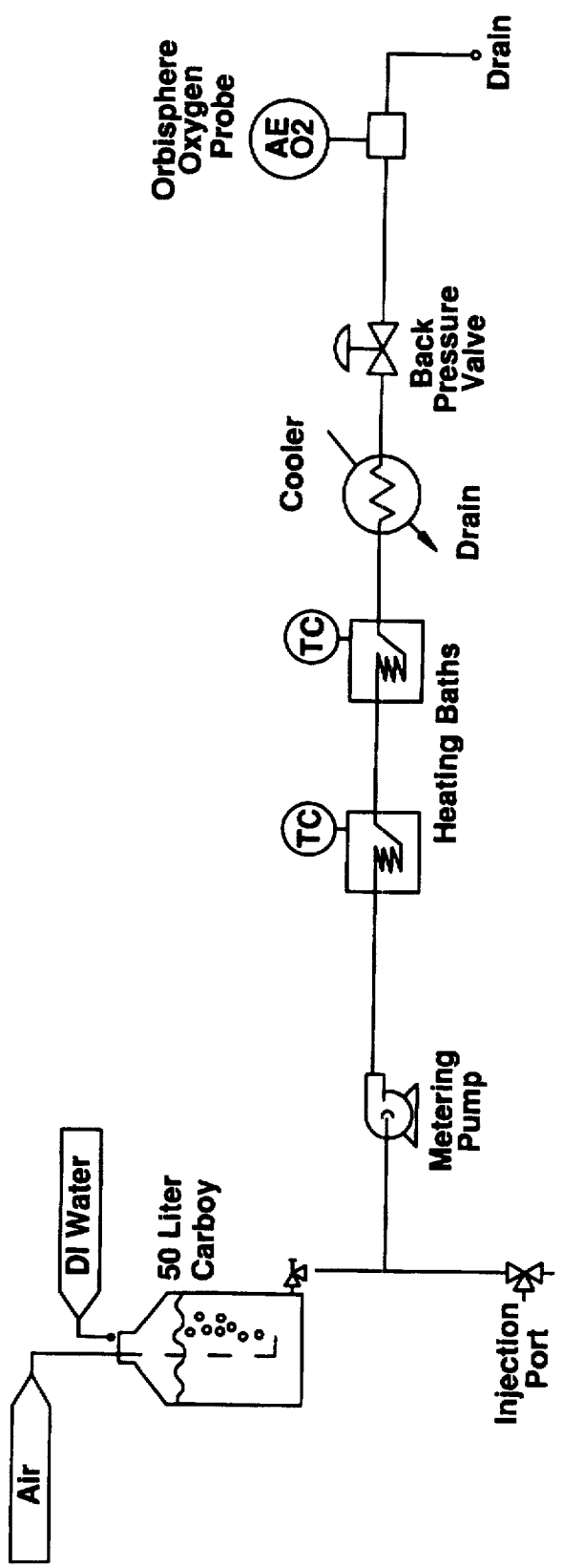
FIG. 2 is a schematic of a scavenger screening apparatus.

A similar experimental procedure to Example 1 was utilized to obtain the results of Table III, wherein the apparatus of FIG. 2 was utilized to evaluate the efficiency of various oxygen scavengers. Reference is made to FIG. 2. The feedstream was ambient temperature (22° C.) air-saturated deionized water. Air-saturation of the feedwater was maintained with a continuous purge with $CO_2$-free air. The pH of the feedwater was adjusted to within the range of 9.0–9.5 with reagent grade sodium hydroxide. All wetted parts were constructed from 316 stainless steel. Syringe infusion pumps were used for injection of scavenger and catalyst. A metering pump pressurized the flow to 85 psig. The first heating bath heated the water stream to about 214° F. in about 30 seconds. The water residence time in the second bath was 4.5 minutes, and the effluent temperature was 251° F. The water stream was cooled slightly below ambient temperature within a few seconds, the pressure was released, and the oxygen concentration of the effluent water was continuously monitored utilizing an Orbisphere oxygen probe. The oxygen baseline (feed) was established at 8.3 ppm. The results show that at lower temperature, tartronic acid removes oxygen efficiently when dosed in conjunction with a catalyst.

TABLE III

Results at 250° F.

| Scavenger | Catalyst | Residual $O_2$ ppm at 4 Equivalents Scavenger |
|---|---|---|
| none | none | 8.3 |
| Sodium Sulfite | Co (0.4 ppm) | 0.12 |
| Hydrazine | Cu (0.4 ppm) | 0.20 |
| Tartronic Acid | Co(1.6 ppm)/Cu(1.6 ppm)/Mn (1.9 ppm) | 0.026 |

Cobalt was supplied from cobalt sulfate, purchased from Shepherd Chemical Co. of Cincinnati, Ohio. Manganese was supplied from manganese sulfate monohydrate, purchased from Fisher Scientific of Fair Lawn, N.J. Copper was supplied from cupric sulfate pentahydrate, also from Fisher Scientific.

Changes can be made in the composition, operation and arrangement of the method of the present invention described herein without departing from the concept and scope of the invention as defined in the following claims:

We claim:

1. A method for removing dissolved oxygen from alkaline water at a temperature greater than 400° F. which comprises adding to alkaline water containing dissolved oxygen an effective oxygen-scavenging amount of a water-soluble carboxylate of the formula:

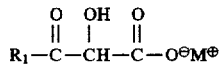

wherein M is selected from the group consisting of hydrogen, sodium, zinc, potassium, morpholine, cyclohexylamine, methoxypropylamine, diethylaminoethanol and diethyl hydroxylamine; and $R_1$ is selected from the group consisting of hydrogen, hydroxy, $C_1$–$C_6$ alkyl, aryl, and —$CH_2$—OH.

2. The method of claim 1 wherein from 2 to 10 moles of carboxylate per mole of dissolved oxygen are added to said water.

3. The method of claim 1 wherein the alkaline water is boiler water.

4. The method of claim 3 wherein the boiler water is subjected to deaeration to reduce the level of dissolved oxygen and the carboxylate is added to the boiler water after deaeration to remove remaining dissolved oxygen.

5. The method of claim 1 wherein M is hydrogen and $R_1$ is hydroxy.

6. A method for removing dissolved oxygen from alkaline water at a temperature between 250° and 400° F. which comprises adding to alkaline water containing dissolved oxygen a) an effective oxygen-scavenging amount of a water-soluble carboxylate of the formula:

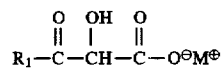

wherein M is selected from the group consisting of hydrogen, sodium, zinc, potassium, morpholine, cyclohexylamine, methoxypropylamine, diethylaminoethanol and diethyl hydroxylamine; and $R_1$ is selected from the group consisting of hydrogen, hydroxy, $C_1$–$C_6$ alkyl, aryl, and —$CH_2$—OH; and b) an effective catalyzing-amount of a catalyst capable of undergoing oxidation-reduction reactions selected from the group consisting of copper, cobalt, manganese, nickel, iron, hydroquinone and combinations thereof.

7. The method of claim 6 wherein from 2 to 10 moles of carboxylate per mole of dissolved oxygen are added to said water.

8. The method of claim 6 wherein the alkaline water is boiler water.

9. The method of claim 8 wherein the boiler water is subjected to deaeration to reduce the level of dissolved oxygen and the carboxylate is added to the boiler water after deaeration to remove remaining dissolved oxygen.

10. The method of claim 6 wherein M is hydrogen and $R_1$ is hydroxy.

* * * * *